No. 695,893. Patented Mar. 18, 1902.
T. L. TINCHER.
LID ATTACHMENT FOR TEA KETTLES.
(Application filed Jan. 2, 1901.)
(No Model.)
Fig. 1.
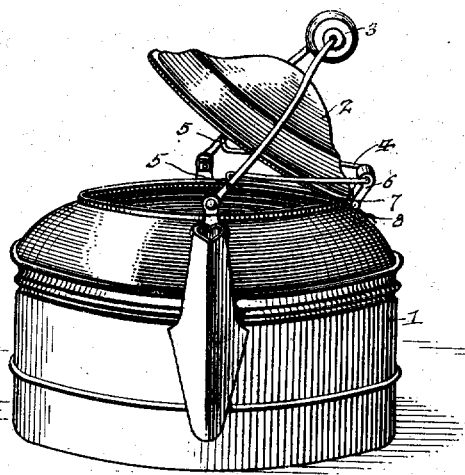
Fig. 4.
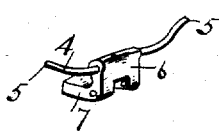
Fig. 2.
Fig. 3.
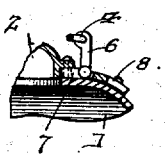
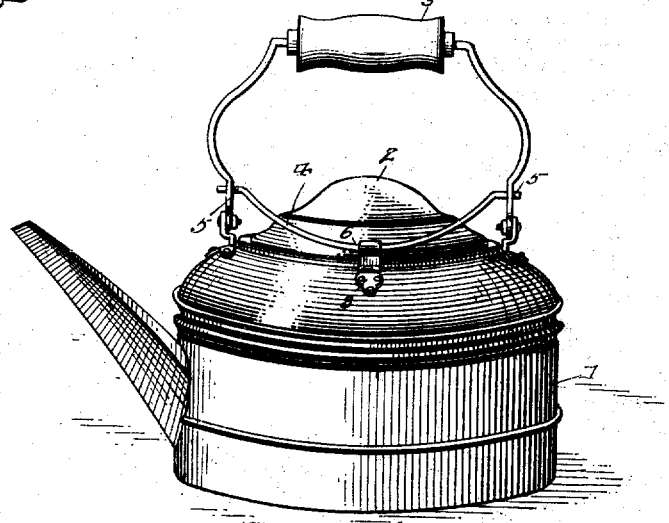
Witnesses
F. E. Alden
H. F. Shepard
T. L. Tincher Inventor
by C. A. Snow & Co.
Attorneys

UNITED STATES PATENT OFFICE.

THOMAS L. TINCHER, OF CHICAGO, ILLINOIS.

LID ATTACHMENT FOR TEA-KETTLES.

SPECIFICATION forming part of Letters Patent No. 695,893, dated March 18, 1902.

Application filed January 2, 1901. Serial No. 41,861. (No model.)

*To all whom it may concern:*

Be it known that I, THOMAS L. TINCHER, a citizen of the United States, residing at Chicago, in the county of Cook and State of Illinois, have invented a new and useful Lid Attachment for Tea-Kettles, of which the following is a specification.

This invention relates to tea-kettles and similar cooking utensils having swinging lids, and has for its object to provide improved means for controlling the lid by the manipulation of the usual swinging bail-handle. It is furthermore designed to insure the tight closure of the lid when the utensil is being lifted or held by the handle and to arrange the attachment so that it will not be in the way in the open and closed positions of the lid.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a perspective view of a tea-kettle having the present lid attachment applied thereto and showing the lid partly open. Fig. 2 is a side view thereof, showing the lid closed. Fig. 3 is a detail sectional view illustrating the connection between the lid, the body of the utensil, and the attachment. Fig. 4 is a detail perspective view of a portion of the lid-hinge and its operating-bail detached.

Like characters of reference designate corresponding parts in all of the figures of the drawings.

Referring to the drawings, 1 designates an ordinary tea-kettle having the usual lid 2 hinged thereto and opening in a direction transversely of the spout of the kettle. The bail-handle 3 has its opposite ends pivotally or hingedly connected to the top of the kettle at opposite sides of the top opening therein and swinging in the same direction as the lid. These parts are common and well known, and therefore may vary in shape, as they have been shown merely to more adequately illustrate the application and operation of the lid attachment.

In carrying out the invention there is provided a yoke or bail 4, which is formed from a single length of stiff wire or a rod of metal bowed into substantially semicircular shape and having its opposite ends bent laterally outward in opposite directions, so as to form the respective terminal pivot pins or studs 5, which are sprung into corresponding perforations in the opposite side portions of the bail-handle adjacent to the pivotal or hinged supports thereof, said pins being inserted from the inner side of the handle. By this arrangement the spring tension of the yoke prevents accidental displacement of the ends thereof and at the same time permits of the convenient application and removal thereof. The intermediate portion of the yoke is passed loosely through a perforate stud or projection 6, rising from the top of the lid at or adjacent to the hinged connection thereof with the body of the kettle. In the present embodiment of the invention the stud or projection 6 forms a part of the hinged connection between the lid and the body of the kettle and is carried by the movable member 7 of the hinge, which is connected to the lid, as shown in Fig. 3 of the drawings. The fixed hinge member 8 is applied to the exterior of the kettle-body, and the movable member comprises integral angularly-related parts 6 and 7, as shown in Fig. 4, which give the movable member a substantially L shape. The top or outer end of the part 6 is perforated or provided with an eye for the pivotal reception of the intermediate portion of the yoke-shaped attachment.

From the foregoing description it will be apparent that the yoke attachment is pivotally connected to the handle and the lid, whereby the yoke is forced laterally outward by swinging the bail-handle downwardly toward the hinged side of the lid, and thereby tilting or raising the lid upon its hinged connection with the body of the kettle, as indicated in Fig. 1 of the drawings. When the handle is standing upright, as when the kettle is being lifted or held by the handle, the yoke is drawn inwardly, thereby closing the lid, which is firmly held in its closed position so long as the bail-handle remains in its upright position, for the lid cannot be opened without a corresponding movement of the yoke and the latter cannot move until actuated by a movement of the handle.

It will be observed that the present attachment does not require any change in the kettle, as the stud or projection 6 may be soldered or otherwise applied to the lid or the hinge thereof, and it furthermore requires only the formation of perforations in the bail-handle for the reception of the ends of the attachment. Moreover, the bowed shape of the yoke conforms to the general shape of the lid, and it also lies closely to the top of the kettle and the lid thereof at the hinged side of the latter, so that it never obstructs the open side of the lid and is therefore never in the way and does not interfere with the free use of the kettle.

What is claimed is—

A cooking utensil having a pivoted swinging bail-handle 3, a lid 2 movable in substantially the same plane with the handle, a hinge comprising leaves 7 and 8 secured to the lid and to the body of the utensil respectively, said leaf 7 having an integral vertically-extended and perforated member 6, and a substantially horizontal lid-controlling bail 4 having its intermediate portion adapted to the opening in the member 6 and its opposite ends being pivotally connected to the opposite portion of the bail-handle adjacent to the terminal hinged connections thereof with the body of the utensil, substantially as specified.

In testimony that I claim the foregoing as my own I have hereto affixed my signature in the presence of two witnesses.

THOS. L. TINCHER.

Witnesses:
HARRY E. SMITH,
JOS. D. BURGESS.